Sept. 2, 1958 D. LOEV 2,850,722

NOISE-FREE TRANSFER CIRCUIT

Filed Aug. 31, 1956

INVENTOR.
DAVID LOEV

BY George Baron

ATTORNEY

United States Patent Office 2,850,722
Patented Sept. 2, 1958

2,850,722

NOISE-FREE TRANSFER CIRCUIT

David Loev, Ambler, Pa., assignor to Burroughs Corporation, Detroit, Mich., a corporation of Michigan Application August 31, 1956, Serial No. 607,341

5 Claims. (Cl. 340—174)

Figure 1:
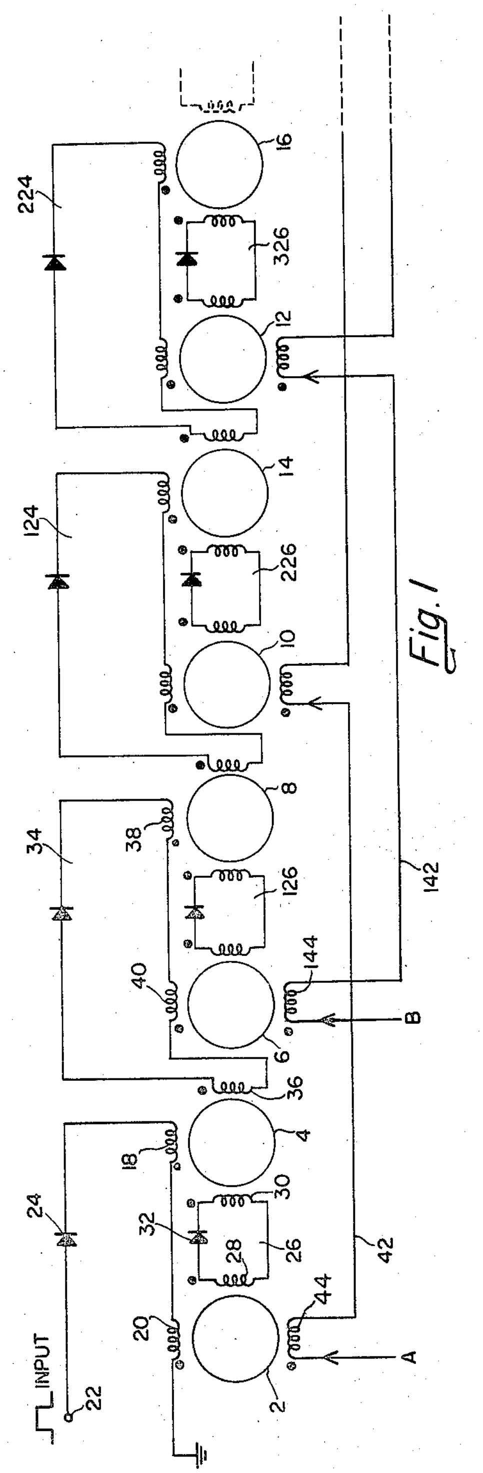

This invention relates to magnetic switching devices and more particularly to switching circuits utilizing bistable elements having substantially square hysteresis loop characteristics.

Magnetic storage devices in the shape of cores, rods, cups or any other suitable geometric shape are employed in shift registers for the purpose of storing information in binary form in such storage devices. Shift registers find particular application in digital computing machines, logic-solving circuits, and the like. Such shift registers are normally composed of a cascade of coupled magnetic cores, such cores having information read into them either serially, in parallel, or at random, wherein the information is shifted from one core to another by the application of suitable advancing or shifting pulses to shifting or advancing windings associated with such cores.

In the shifting of information stored in one core to an adjacent core, simple transfer loops couple one core with its adjacent core. These transfer loops are adapted to transfer information from one core to its adjacent core in a forward direction. However when the core which has received information at time $t_1$ from a core immediately to its left transfers at time $t_2$ information to a third core located to its right, the transferred information taking place at time $f_2$ may be sent through transfer loops in a backward direction as well as in a forward direction. Such reverse transfer of information is undesirable in that it puts incorrect information into a core. Such undesired information results in the transfer through the shift register of spurious signals. Prior art devices have relied upon using more turns in the output winding of a transferor core than in the input winding of a transferee core, wherein the output windings and input windings are in the same transfer loop coupling the transferor core with the transferee core. Another technique for avoiding backward flow of information has been the reliance on a diode shunting the transferee input winding so that reverse signals circulate through this shunting diode and input winding rather than pass through the output winding of the transferor core. Such means for avoiding backward flow of information are shown in the Booth Patent 2,680,819, issued on June 8, 1954.

The present invention avoids the use of such an auxiliary shunting diode and also decreases the chance of backward flow of information. The instant invention attains the aforementioned by utilizing two cores to retain a single bit of information. A transfer loop couples these two cores but an advancing or shifting winding is coupled to only one of such two cores. A second pair of cores is adapted to receive information which is read out of the first two cores that initially store the information put into the register. A transfer loop couples the second core of the first pair of cores to both cores of the second pair of cores. Information is transferred from the first pair of cores to the second pair of cores by applying a shifting or advancing pulse to the first core of the first pair of cores. Such advancing pulse reads out the first core, such read-out causing the second core of the first pair to be read out, which in turn causes such read-out information to be stored in both cores forming the second pair of cores. Now when a second advancing pulse is applied to the first core of the second pair of cores there may be a spurious transfer of information backwards to the first group of cores, but such spurious transfer is stored only in the second core of the first pair of cores. However, the second core of the first pair of cores never has an advancing or shifting pulse applied thereto so such reverse flow of information is never utilized by the shift register and can never be advanced as spurious information.

Consequently it is an object of this invention to provide an improved transfer circuit employing bistable magnetic storage devices.

It is a further object to provide an improved transfer circuit having particular utility in shift registers.

It is yet another object to prevent the backward flow of information in any transfer circuit utilizing bistable magnetic elements.

Figure 2:
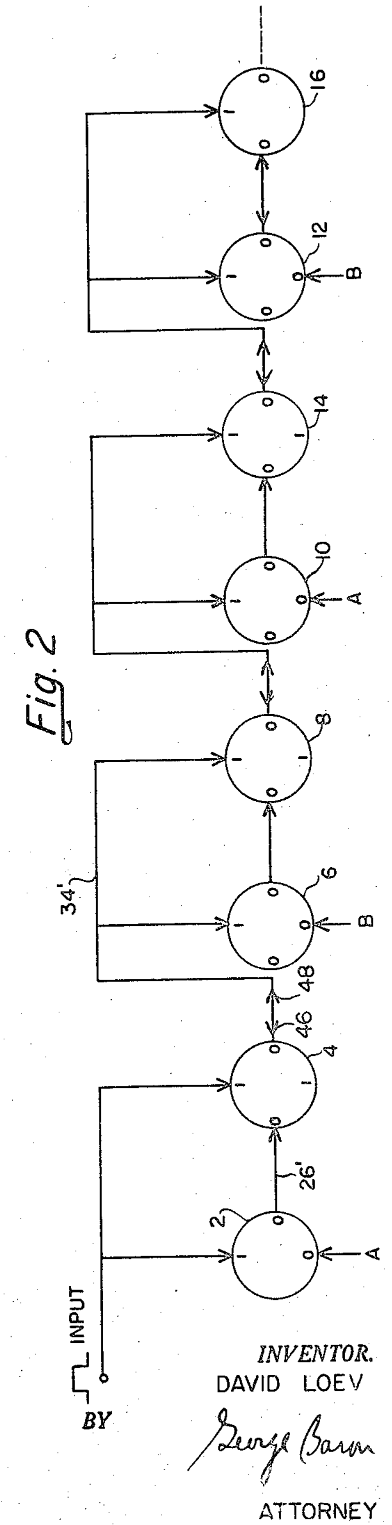

The invention will now be described with reference to the accompanying drawings, in which:

Fig. 1 illustrates diagrammatically a portion of a register arrangement for a digital computer; and Fig. 2 is a logical diagram of the schematic shown in Fig. 1.

Referring to Fig. 1, there is shown an array or cascade of magnetic elements in the shape of cores, it being understood, however, that any other geometric shape could be employed without departing from the spirit of the invention. Cores 2 and 4 represent the input cores for the shift register of Fig. 1. Cores 6 and 8, 10 and 14, and 12 and 16 are other similar pairs of cores utilized in the shift register, it being understood that many more pairs than are shown in Fig. 1 may be used depending upon the capacity of the shift register. Each of the cores 2 and 4 may be placed in either one of its two stable remanent states by applying suitable input pulses to windings 18 and 20 that are coupled to cores 4 and 2, respectively. Such input pulses enter terminal 22, pass through diode 24 and through windings 18 and 20. The convention used in describing the instant invention holds that current entering the dotted terminal of a winding coupled to a core will tend to drive such core to its negative remanent state whereas current entering the undotted terminal of a similar winding will drive the core to its positive remanent state. The positive remanent state of a core is arbitrarily chosen to represent the storage of a "1" whereas the negative remanent state of the core represents the storage of a "0." A simple transfer loop 26 couples cores 2 and 4 wherein winding 28 is the output winding for core 2 and winding 30 is the input winding for core 4. The diode 32 permits current flow through the transfer loop 26 in a clockwise direction. In many instances, such diode 32 may be replaced by a resistive element. Transfer loop 34 couples core 4 to cores 6 and 8 such that winding 36 is the output winding of core 4 and windings 38 and 40 are respectively the input windings for cores 8 and 6. Transfer loops 126, 226, and 326 are similar to transfer loop 26 whereas transfer loops 124 and 224 are similar to transfer loop 34. Assume that information is put into the shift register by sending a pulse of current through windings 18 and 20, such current entering through the undotted terminals of windings 18 and 20 so as to place cores 4 and 2 into their respective "1" states. Information stored in core 2 must be transferred to core 6 at time $t_1$, and then at some time $t_2$ later such stored information in core 6 must be transferred to core 10, such information in core 10 then being transmitted to core 14, such being the manner in which information stored in a shift register is advanced serially along said register.

The invention will now be described as it is practiced in carrying out the aforesaid objects. When cores 2 and 4 have been placed in their respective "1" states, an advancing or shifting pulse is applied to advancing winding 42, such advancing current entering winding 44 through its dotted terminal. The advancing current pulse switches magnetic core 2 from its positive remanent state toward its negative saturation state producing an output in transfer loop 26 such that current is made to flow in a clockwise direction through such transfer loop 26. The induced current in transfer loop 26 will enter the dotted terminal of winding 30 as it flows through such winding so as to switch core 4 from its positive remanent state toward its negative saturation state. Such switching of core 4 induces current flow in transfer loop 34 in a clockwise direction through transfer loop 34. Such clockwise flow of induced current will tend to drive cores 8 and 6 toward their respective positive saturation states. Upon termination of the advancing A pulse applied to advancing winding 42, cores 2 and 4 relax to their respective negative remanent states and cores 8 and 6 relax to their respective positive remanent states. Consequently the "1" that was stored in the pair of cores 2 and 4 has been transferred to cores 6 and 8.

At some predetermined time after the termination of the A advancing pulse, the advancing B pulse is applied to core 6 of the pair of cores 6 and 8. It is understood, by those skilled in the shift register art, that advancing pulses A and B are clock pulses that appear periodically to read out one set of cores and then another set of cores, such A and B pulses never appearing simultaneously. A single generator employing conventional techniques may be relied upon to supply such alternate A and B pulses, or two separate generators may be used. Such manner of operation being well known in the shift register art utilizing two cores per bit of information.

The advancing B pulse which is applied to advance winding 142 enters winding 144 coupled to core 6 through the dotted terminal of such winding 144 to read out the "1" stored in such core, such read-out inducing a current in transfer loop 126 so as to read out the "1" residing in core 8. The read-out of core 8 stores a "1" in cores 10 and 12 through transfer loop 124 in a manner similar to the storage of a "1" in cores 8 and 6 when core 4 was read out. When cores 6 and 8 have been switched to their respective "0" states by the application of an advancing pulse B to winding 142, currents are induced in a clockwise direction through transfer loop 34, causing magnetic core 4 to be shifted toward its "1" state. The "1" or partial "1" stored in core 4 does not disable the proper operation of the shift register because such a partial "1" does not reach core 2, or reaches core 2 in a very attenuated state. For example, if we assume that the number of turns of winding 28 is 50 turns and that of winding 30 is 10 turns and that a similar turns ratio exists between winding 36 and windings 38 and 40, the switching of core 6 due to the presence of an advancing B pulse might store a $\frac{1}{10}$ of a "1" signal into core 4. Such partial switching of core 4 might result in a $\frac{1}{10}\times\frac{1}{10}$ noise pulse being set in core 2. In reality, due to relatively large energy losses in core 4, the noise fed back into core 2 might be $\frac{1}{1000}$ of a "1" signal, or none whatsoever if the current fed back through loop 26 is less than the coercivity of core 2. Consequently, for most practical designs, the presence of a second core, such as core 4, prevents the backward flow of spurious signals.

Thus when advancing pulses A are applied to the shift register in order to shift information residing in cores such as cores 2, 6, 10 and 12 to the right, such cores, as represented by core 2, will remain in a "0" state regardless of the backward transfer of information through a transfer loop such as transfer loop 34. Therefore, whenever an input pulse enters the input terminal 22 in order to put a "1" into the shift register, core 4 will already have been placed into its "1" or partial "1" state by the reverse flow of information through transfer loop 34, so that such input pulse will only drive core 4 further into its "1" state. By employing an additional core in the manner herein described, one may use simple unconditional transfer loops in the shift register.

The invention is shown in symbolic logic form in Fig. 2. An input signal sets cores 2 and 4 into their respective "1" states. When an "A" advancing pulse is applied to core 2 and its corresponding cores, the "1" in core 2 is transferred through transfer loop 26, represented symbolically as line 26', to core 4, causing the latter core 4 to switch and switch cores 6 and 8 to their respective "1" states. Line 34' represents the transfer loop that couples core 4 with its next successive pair of cores 6 and 8. Arrows 46 and 48 indicate that information flow may take place in a backward as well as in a forward direction.

The showing in the drawings of the number of turns in windings, such as windings 18, 20, 26, 28, etc., is not intended to indicate the relative number of turns on such windings. The number of turns is a matter of engineering design to be varied with the choice of current driver for applying advancing pulses to the shift register, characteristics of the cores, and type of diodes used in the transfer loops.

What is claimed is:

1. A shift register comprising a cascade of groups of bistable magnetic elements, each group comprising a pair of bistable magnetic elements, a first transfer loop coupling both elements of each pair, a second transfer loop coupling the second element of each pair to both elements of the next successive pair of elements, and shift means for applying advance switching energy to only the first element of each pair of elements.

2. A shift register for advancing binary information therethrough comprising a plurality of pairs of bistable magnetic elements, means for introducing a "1" into both elements comprising the first pair of elements, a first transfer loop coupling the elements of each pair, a second transfer loop coupling the second element of each pair of elements to both adjacent successive elements, first means for applying advancing pulses to the first element of each odd pair of elements so as to tend to switch the first element of each pair to its "0" state, such actual switching of said first element to the "0" state causing an output current to be induced in said first transfer loop to switch the associated second element to the "0" state, such actual switching of said second element to its "0" state inducing a current in said second transfer loop so as to tend to switch said both adjacent successive elements to their respective "1" states, and a second means for applying advancing pulses to the first element of each even pair of elements whereby should any information be transferred backward through any of said second transfer loops during the application of either of said advancing pulse means, such information would be stored only in the second element of each pair of elements.

3. A shift register comprising a cascade of groups of bistable magnetic elements, each group comprising pairs of bistable magnetic elements, means for reading into both elements of the first pair a bit of information to be shifted from groups of elements to its successive adjacent groups of elements, a first transfer loop coupling both elements of each pair, a second transfer loop coupling the second element of said first pair of elements to both elements of said second pair, means for applying an advancing pulse to said first element of said first pair so as to read out the information bit therein into the second element of said first pair by switching said second element through said first transfer loop, the switching of said second element tending to switch said next successive elements through said second transfer loop, and second advancing pulse means applied, time sequentially from the first advancing pulse means, to the first element of the second pair of elements for switching the information therein to the next successive pair of cores, whereby if any information is transferred in a backward direction through said second transfer loop such information will be stored only in the second element of said first pair of elements.

4. A shift register for advancing information in binary form therethrough comprising a plurality of pairs of bistable magnetic elements, means for introducing information into said register by setting both elements of said first pair of elements into their respective "1" states, a first transfer loop coupling the elements of each pair, a second transfer loop coupling the second element of each pair to the next adjacent successive pair of elements and adapted to transfer the information stored in such second element when the latter is switched from its "1" state to its "0" state to each element of such adjacent of the odd pair of elements, means for applying alternate advancing pulses to the first element of each successive pairs of elements so as to tend to switch such first elements to their respective "0" states, such actual switchings causing an induced current to flow in said first transfer loops so as to tend to switch said second element of each first transfer loop to its "0" state, such switchings of said second elements to their respective "0" states inducing currents in said second transfer loops so as tend to switch both elements associated with said second transfer loops to their respective "1" states, and means for applying the other alternate advancing pulses to the first element of every even pair of elements whereby if a "1" tends to be transferred backward through one of said second transfer loops such "1" is stored only in the second element of each pair of elements.

5. A shift register for advancing information in binary form therethrough, said register comprising: a plurality of pairs of bistable magnetic elements; means for introducing information into said register by setting both elements of the first pair of elements into the "1" state; an intra-pair transfer loop for each pair of elements, said loop including an output winding on the first element of the pair and an input winding on the second element of the pair, said output winding having a substantially larger number of turns than said input winding; an inter-pair transfer loop coupling the second element of each pair to both elements of the next pair, said inter-pair transfer loop including an output winding on the second element of the pair and an input winding on each of the elements of the next pair, said next-pair input windings being connected in series, said second-element output winding having a substantially larger number of turns than the sum of said next-pair input windings; means for applying alternate advancing pulses to the first element of each odd-numbered pair of elements to switch or to tend to switch said odd-pair first elements to the "0" state, the actual switching of an odd-pair first element to the "0" state causing an induced current to flow in the associated intra-pair transfer loop effective to switch the second element of the pair to the "0" state, such switching of said second element to the "0" state causing an induced current to flow in the associated inter-pair transfer loop effective to switch both elements of the next pair to the "1" state; and means for applying the other alternate advancing pulses to the first element of each even-numbered pair of elements to switch or to tend to switch said even-pair first elements to the "0" state, the actual switching of an even-pair first element to the "0" state causing an induced current to flow in the associated intra-pair transfer loop effective to switch said even-pair second element to the "0" state.

References Cited in the file of this patent

UNITED STATES PATENTS

| | | |
|---|---|---|
| 2,781,503 | Saunders | Feb. 12, 1957 |
| 2,784,390 | Chien | Mar. 5, 1957 |

UNITED STATES PATENT OFFICE

CERTIFICATE OF CORRECTION

Patent No. 2,850,722 September 2, 1958

David Loev

It is hereby certified that error appears in the printed specification of the above numbered patent requiring correction and that the said Letters Patent should read as corrected below.

Column 1, line 17, after "stable" insert -- magnetic --; line 40, for "$f_2$" read -- $t_2$ --; column 5, lines 18 and 19, for "of the odd" read -- successive --; line 20, for "successive" read -- of the odd --.

Signed and sealed this 10th day of March 1959.

(SEAL)
Attest:

KARL H. AXLINE
Attesting Officer

ROBERT C. WATSON
Commissioner of Patents